United States Patent Office 3,808,172
Patented Apr. 30, 1974

3,808,172
TECHNIQUE FOR RETARDING ENVIRONMENTAL STRESS CRACKING OF POLYMERS AND POLYMERIC COMPOSITION THROUGH THE ADDITION OF SILANE COMPOUNDS
Robert Vincent Albarino, Berkeley Heights, and Harold Schonhorn, New Providence, N.J., assignors to Bell Telephone Laboratories, Incorporated, Murray Hill, N.J.
No Drawing. Filed Sept. 27, 1972, Ser. No. 292,822
Int. Cl. C08g 51/60
U.S. Cl. 260—45.9 R                                      10 Claims

ABSTRACT OF THE DISCLOSURE

Environmental stress cracking of polyethylene is significantly retarded by the incorporation in molten polyethylene of silanes having the formula $$(RO)_3\text{—Si—}(CH_2)_n NHR'$$

wherein R is selected from the group consisting of alkyl radicals having from 1 to 6 carbon atoms and R' is selected from the group consisting of hydrogen and a $(CH_2)_{n'}\cdot NH_2$ radical, $n$ and $n'$ being integers ranging from 1 to 6. Studies have revealed that the stress crack resistance of polyethylene so treated is enhanced by a factor of at least 2 as compared with a conventional unmodified polymer.

---

This invention relates to a method for the retardation of environmental stress cracking of polymers and the resulting polymeric composition. More particularly, the present invention relates to a technique for inhibiting environmental stress cracking of ethylene polymers by incorporation therein of a silane compound, and to the resultant composition.

During the past 20 years, olefinic polymers have received considerable recognition and have been widely utilized in industry and consumer applications. Unfortunately, environmental stress cracking, a phenomenon essentially peculiar to ethylene homopolymer and, to a lesser extent, copolymers and blends in which ethylene comprises the major portions, has precluded the total exploitation of the material. This phenomenon is a purely physical occurrence which typically involves no chemical degradation or alteration of the material or other evident physical change beyond the development of macroscopically brittle cracks or fractures at stresses less than the short time strength of the material. Accordingly, workers in the art have continually focused their interest upon the development of techniques for reducing the sensitivity of ethylenic plastics to environmental stress cracking.

Earlier studies of the phenomenon suggested that the environmental stress crack resistance of polyethylene improves as the melt index decreases, that is, as molecular weight increases. Additionally, it was found that increased crystallinity (density) has a marked effect on stress cracking and that, in general, a polyaxial stress with an active shear component is essential for environmental failure of low density polyethylenes. However, the importance of this complexity decreases with increasing crystallinity; thus, it was logical to approach the stress cracking problem by increasing the molecular weight of the polyethylene by using a high density material, a strategy which unfortunately sacrifices the desirable characteristics of the low density material. Alternatively, efforts were made to attain a similar end by the use of the cross-linking phenomenon, such being effected by irradiation, chemical agents and the like. Despite these efforts, the search has continued for a viable solution to this perplexing problem which would not involve altering the basic integrity of the ethylenic polymer or increasing the economics of processing.

In accordance with the present invention, these prior art difficulties are successfully obviated by incorporating in the polymer of interest a silane compound of the general formula $(RO)_3\text{—Si—}(CH_2)_n NHR'$, where R is selected from the group consisting of alkyl radicals having from one to six carbon atoms and R' is selected from the group consisting of hydrogen and a $(CH_2)_{n'}\cdot NH_2$ radical, $n$ and $n'$ being integers ranging from one to six.

Although the stress cracking agent described herein is effective in a wide variety of thermoplastic materials, the problem in issue is prevalent primarily in ethylene polymers. Polymers falling within the scope of the term ethylene include homopolymers of ethylene produced by the various known low and high pressure processes, and copolymers comprising a major portion of ethylene and a minor portion of a monomer copolymerizable therewith, as well as blends comprising a major portion of polyethylene and a minor portion of a compatible polymer. Exemplary copolymers are ethylene-propylene, ethylene-butene, ethylene-vinyl acetate and the like. Blends include blends of high and low pressure process polyethylenes, polyethylenepropylene, polyethylene-polybutene, polyethylene-polyvinyl acetate and the like. The silane compounds employed in the practice of the present invention are amino silanes which do not interact with the ethylenic polymers or other agents, are resistant to oxygen and are capable of forming a secondary cross-linking matrix in the presence of water. Therefore, as the host polymer is degraded mechanically, a new interpenetrating network is generated to increase the mechanical strength of the boundary region of the spherulites in the polymer. Particularly useful compounds for use as stress cracking inhibitors in the practice of the present invention are gamma-aminopropyltriethoxysilane $$[(CH_3CH_2O)_3\text{—Si—}(CH_2)_3NH_2]$$

and N-beta-(aminoethyl)-gamma-aminopropyltrimethoxysilane $$\left[(CH_3O)_3\text{—Si—}(CH_2)_3\overset{H}{N}\text{—}(CH_2)_2NH_2\right]$$

In addition to improving the environmental stress cracking properties of the polymer, these agents increase the melt index of the molten material. That is, the amino silane agents act as internal flow lubricants in allowing melt fabrication with lower energy expenditures while producing little effect on the properties of the material in its solid state, in contrast to the effect of plasticizers.

These silanes, which are readily available from commercial sources, may be incorporated in the polymer of interest by conventional milling or compounding. In the practice of the present invention, the silane may be added in an amount not exceeding the solubility limit of the material in the polymer, typically, about 2 percent by weight, based upon the weight of the polymer. Studies have revealed that optimum results are obtained by the addition of from 1 to 2 percent by weight silane, based upon the weight of the polymer. Other additives, such as fillers, pigments, plasticizers and the like can be incorporated with the silane or separately, if desired.

Examples of the present invention are set forth in detail below. It will be appreciated by those skilled in the art that the exemplary embodiments are merely illustrative in nature and are not to be construed as limiting.

Silanes of the type described below were incorporated into unstabilized low density polyethylene (0.91) by milling at high shear for five minutes at 260° F. Secondary effects likely to affect stress cracking, such as oxidation, were standardized by milling a control with each silane tested. Milled composites, 0.125 inch thick, were next molded against polished aluminum plates lined with a 0.005 inch aluminum foil at 300 p.s.i. at the maximum temperature and 500 p.s.i. during cooling. Stress crack resistance of the resultant composites was then measured by ASTM method D1693–70 utilizing a stress crack agent comprising a 10 percent aqueous solution of an alkylated aryl polyether alcohol maintained at 50° C. Melt index (ASTM D1238–65T, Procedure A), gel fraction and gel permeation chromatography were used to assess changes in cross linking. The table which follows sets forth the results of the stress cracking experiments normalized with respect to the time for failure for the control. The polyethylenic compositions tested (in a separate series of experiments) were also subjected to hydrolysis prior to mounting in the test rack by boiling the milled sheets for 65 minutes in water.

TABLE

| Silane | Polyethylene | Nominal weight percent (silane) | Melt index [1] | L[2] $t_f$ silane/ L$t_f$ control |
|---|---|---|---|---|
| Example 1: | | | | |
| $(CH_3CH_2O)_3$— 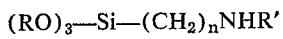—Si—$(CH_2)_3$— $NH_2$ | Low density (0.91) | 1.0 | 0.19/0.19 | 1.1 (unhydrolyzed). |
| | | 2.0 | 0.20/0.19 | Do. |
| | | 1.0 | | 1.2 (hydrolyzed). |
| | | 2.0 | | Do. |
| Example 2: | | | | |
| $(CH_3O)_3$—Si— 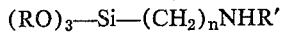 H $(CH_2)_2N(CH_2)_3$ | Low density (0.91) | 1.0 | 0.20/0.19 | 1.4 (unhydrolyzed). |
| | | 2.0 | 0.22/0.19 | Do. |
| $NH_2$ | | 1.0 | | 2.4 (hydrolyzed). |
| | | 2.0 | | Do. |

[1] Ratio of Melt index silane/Melt index control.
[2] Ratio of time to failure of polyethylene-silane mixture to the time to failure of the control.

Analysis of the data set forth in the foregoing table reveals that both high boiling, hydrolyzable silanes evidenced improved resistance to stress cracking when unhydrolyzed and even greater resistance to stress cracking following hydrolysis.

What is claimed is:

1. Composition of matter comprising a thermoplastic polymer derived from monomers of which the major portion by weight is ethylene having homogeneously blended therein a silane compound of the general formula $$(RO)_3—Si—(CH_2)_nNHR'$$

wherein R is selected from the group consisting of alkyl radicals having from 1 to 6 carbon atoms and R' is selected from the group consisting of hydrogen and a $(CH_2)_{n'}\cdot NH_2$ radical, $n$ and $n'$ being integers ranging from 1 to 6, said silane being present in an amount not exceeding the solubility limit of the silane in the polymer.

2. Composition in accordance with claim 1 wherein said polymer is low density polyethylene.

3. Composition in accordance with claim 1 wherein said silane compound is gamma-aminopropyltriethoxysilane.

4. Composition in accordance with claim 1 wherein said silane compound is N-beta-(aminoethyl)-gamma-aminopropyltrimethoxysilane.

5. Composition in accordance with claim 4 wherein said silane is hydrolyzed.

6. Technique for retarding environmental stress cracking of a thermoplastic polymer derived from monomers in which the major portions by weight are ethylene which comprises homogeneously blending with said polymer in molten form a silane compound of the general formula $$(RO)_3—Si—(CH_2)_nNHR'$$

wherein R is selected from the group consisting of alkyl radicals having from 1 to 6 carbon atoms and R' is selected from the group consisting of hydrogen and a $(CH_2)_{n'}NH_2$ radical, $n$ and $n'$ being integers ranging from 1 to 6, said silane being present in an amount not exceeding the solubility limit of the silane in the polymer.

7. Technique in accordance with claim 6 wherein said polymer is low density polyethylene.

8. Technique in accordance with claim 6 wherein said silane compound is gamma-aminopropyltriethoxysilane.

9. Technique in accordance with claim 6 wherein said silane compound is N-beta-(aminoethyl)-gamma-aminopropyltrimethoxysilane.

10. Technique in accordance with claim 6 wherein said silane is hydrolyzed.

References Cited

UNITED STATES PATENTS

| 3,304,318 | 2/1967 | Brady | 260—448.8 R |
| 3,388,079 | 6/1968 | Vandenberg | 260—45.9 R |

FOREIGN PATENTS

| 223,309 | 8/1968 | U.S.S.R. | 260—45.9 R |
| 6512705 | 9/1965 | Netherlands | 260—45.9 R |

OTHER REFERENCES

H. F. Mark et al.: Encyclopedia of Polymer Science and Technology, vol. 3, 1965, pp. 667–669.

H. F. Mark et al.: Encyclopedia of Polymer Science and Technology, vol. 6, 1967, pp. 300–301.

Ritchie: Physics of Plastics, 1965, pp. 193–195.

DONALD E. CZAJA, Primary Examiner

G. R. MARSHALL, Assistant Examiner

U.S. Cl. X.R.

260—448.8 R